(12) United States Patent
Khatchatrian et al.

(10) Patent No.: US 6,406,503 B1
(45) Date of Patent: Jun. 18, 2002

(54) METHOD OF PREPARING BLACK DYE FROM A NATURAL PRODUCT

(75) Inventors: Robert G. Khatchatrian; Tigran Khatchatrian, both of Glendale, CA (US)

(73) Assignee: Royal Caviar, Inc., Glendale, CA (US)

( * ) Notice: Subject to any disclaimer, the term of this patent is extended or adjusted under 35 U.S.C. 154(b) by 0 days.

(21) Appl. No.: 09/484,623

(22) Filed: Jan. 18, 2000

(51) Int. Cl.$^7$ ................................................. C09B 61/00
(52) U.S. Cl. ..................... 8/646; 8/638; 8/526; 8/637.1
(58) Field of Search ............................ 8/438, 646, 526, 8/637.1; 106/406

(56) References Cited

U.S. PATENT DOCUMENTS

| | | | |
|---|---|---|---|
| RE1,959 E | * | 5/1865 | Howe et al. |
| 2,507,465 A | * | 5/1950 | Ayers |
| 2,554,450 A | * | 5/1951 | Ayers |
| 4,874,619 A | * | 10/1989 | Leonardo et al. |

FOREIGN PATENT DOCUMENTS

| | | |
|---|---|---|
| DE | 3637826 C1 | 5/1988 |
| DE | 195 11 588 A1 | 10/1996 |
| FR | 2030581 | 11/1970 |
| RU | 1784623 | 12/1992 |
| RU | 2035478 | 5/1995 |

OTHER PUBLICATIONS

Weigle, "Ancient Dyes for the Modern Weaver" chapter entitled, "Black Walnut Hulls", 1974.*
Color Index, vol. 3, p. 3249, 1971.*
Database WPI Section Ch, Week 199410 Derwent Publications Ltd., London, GB; Class D21, AN 1994–080714 XP002180798 & RU 2 002 459 C (Azerb Agric Mech Electrif Inst), dated Nov. 15, 1993.
Database, WPI Section PQ, Week 199702 Derwent Publications Ltd., London, GB; Class P41, AN 1997–019335 XP002180797 & RU 2 057 588 C (Vikhrevye Tekhnologii Stock Co), dated Apr. 10, 1996.
International Search Report for PCT/US001/01528 (3 pages) 10/2001.

* cited by examiner

*Primary Examiner*—Margaret Einsmann
(74) *Attorney, Agent, or Firm*—Knobbe, Martens, Olson & Bear LLP

(57) ABSTRACT

The present invention relates to a method of preparing dye from natural materials. The dye derived from the method of the present invention may be used in the cosmetic, pharmaceutical and food industries.

15 Claims, No Drawings

METHOD OF PREPARING BLACK DYE FROM A NATURAL PRODUCT

BACKGROUND OF THE INVENTION

1. Field of the Invention

The present invention relates to a method of preparing dye from natural materials. The dye derived from the method of the present invention can be used in the cosmetic, pharmaceutical and food industries.

2. Description of the Related Art

A method of preparing dye from the lobes, pistils and pollen of the hibiscus plant is well known. The method comprises extracting the dye using organic acids, removing the solvents, and drying and refining the dye into a form that can be sold commercially. The red dye prepared in this way is often used in cosmetics, such as lipstick, nail polish, shampoo and blush.

The disadvantages of using dye prepared from the hibiscus are that only red colors can be obtained and that the low adhesive properties of the dye prevent its use as a hair color product. In addition, the method of obtaining dye from the hibiscus is ecologically unsound because organic acids are used in the extraction.

Another known source of natural dyes is red algae. Red algae can be dried and ground, producing an insoluble powder made up of 200–400 micron particles. This dye has similar disadvantages to the dye obtained from hibiscus: it is only available in the color red and it can not be used as a hair color product because of its low adhesive properties.

A brown dye of natural origin can be prepared from the rind of the ripe walnut. Such a dye is described in USSR Certificate No. 1784623 (1992). This dye is often used in the food-processing industry to stain confectionery products brown so that they resemble chocolate. However, this dye tends to degrade over time. Thus, the dye cannot be used in foods, such as cookies, which require long-term storage. Additionally, the dye's lack of stability renders it unsuitable for cosmetics, such as hair color products. Moreover, a black dye cannot be obtained from ripe walnut rinds.

A black dye used in food products is derived from drying and refining tea leaves. The tea leaves are ground to particles of 200–400 microns and water-extracted at 92° C. for 20 minutes. The tea extract can be separated from the sediment by centrifugation and/or filtration. The extract is then dried and a soluble powder obtained. However, the low degree of extractability of this dye is disadvantageous.

Thus there exists a need for a black dye produced from natural materials that may be used in a wide variety of contexts, including hair color products, foodstuffs and cosmetics. There is an additional need for a method of producing such a dye in a high yield manner.

SUMMARY OF THE INVENTION

The method of the present invention comprises obtaining unripe walnut rinds, drying said walnut rinds to produce dried walnut rinds, and grinding the dried walnut rinds to form a dispersible powder.

DETAILED DESCRIPTION OF THE PREFERRED EMBODIMENT

The method of the present invention comprises grinding the rind of unripe walnuts to form a dispersible powder. This dispersible powder may be used as a dye. In another embodiment, the dispersible powder is subject to water extraction to produce a liquid dye. In a third embodiment, the liquid dye is dried, producing a powdered dye.

The ability to extract dye from natural materials can be influenced by a number of different factors. In particular, the ability to extract dye depends upon the solubility of the dye in a particular solvent, such as water. It is well known that the solubility of dye contained in particles increases with the increasing surface area of the particles. Thus, reducing the dye-containing rind in the method of the present invention to dispersible particles of less than 100 microns increases the solubility and hence efficiency of extraction considerably compared to the use of 200–400 micron particles in methods known in the art.

Only six species of walnut are native to the United States. About fifteen others of this type of trees are from South America, the West Indies, Southern Europe and Asia. Any of these species can be used in the context of the present invention. The fruit of the walnut tree is a nut that grows on the tree. It is enclosed in a thick leathery shell which does not split open until it is ripe. The thick leathery shell is referred to herein as the "rind" of the walnut. Rinds which have not yet split open are referred to herein as "unripe" walnut rinds. The rind of unripe walnuts is used as a source material in the method of the present invention.

The rinds of unripe walnuts must be separated from the nutmeat and other components of the nut. This may be accomplished by any method known in the art, such as those techniques used for pitting prunes and other fruit. The rinds are dried until they contain no more than 50% water by mass. More preferably, the rinds are dried until they contain less than 20% water by mass. Any method of drying known in the art may be employed. One example is drying in a gas stream of 70–100° C.

The dried rind is then refined to produce a dispersible powder comprising particles less than 100 microns in diameter and containing no more than 10% water by mass. More preferably, the particles are no more than 50 microns in diameter and the dispersible powder contains no more than 2 to 3% water by mass. This may be done by any of a variety of methods known in the art. In the preferred embodiment, this is accomplished in two stages. In the first stage, the rinds are crushed to produce particles of no more than 0.1–10 mm in diameter. More preferably, the particles produced are no more than 0.5–1 mm in diameter. In the second stage, the particles are further reduced in size to less than 100 microns in diameter. This may be done, for example, in a rotational grinding mill. Simultaneously the particles are further dried in a gas stream of no more 80–90° C. The resulting dispersible powder is preferably composed of particles less than 100 microns in diameter and contains no more than 10% water by mass. More preferably, the particles of the resulting dispersible powder are no more than 50 microns in diameter and the dispersible powder contains no more than 2 to 3% water by mass. The dispersible powder may be used directly as a dye. For example it can be used to dye foodstuffs. Alternatively, the dispersible powder may be subject to water extraction as described below to produce a more pure dye.

The dispersible powder is mixed with water and extracted by boiling for not less than 30 minutes. The ratio of dispersible powder to water is preferably between 2:1 and 1:20. More preferably, the ratio of dispersible powder to water is no more than 1:7 during the water extraction. Following boiling, sediment is removed from the liquid extract. This may be done by any method known in the art. For example, the extract may be filtered.

In a further embodiment, during the extraction process the mixture of dispersible powder and water is subject to sonication. Preferably, the frequency will be not less than 10 Hz.

In one embodiment a preservative is added to the liquid extract to prevent breakdown of the dye. For example, benzoic acid (1–3% by mass) may be added to the liquid extract. In this embodiment, the liquid extract may be bottled and sold commercially as a dye that may be used, for example, in hair color products.

In another embodiment, the liquid extract is dried by spray drying at a temperature of 100–170° C. This will result in a powdered dye containing no more than 2–3% water by mass. However, any method known in the art for reducing a water-based extract to a powder may be used. The resulting powder may be sold commercially as a dye for use in cosmetics, foodstuffs and hair color products.

The black dye powder obtained by the method of the present invention contains natural biologically active compounds. For example, the dye may have anti-sclerotic activity and may reduce cholesterol when consumed in foodstuffs.

EXAMPLE 1

The rinds of unripe walnuts are placed in an 70–100° C. airflow and dried until they contain no more than 20% water by mass. The rinds are then ground to produce medium-sized particles of 0.5–1 mm. These particles are further reduced in size in a rotational gas-dynamic grinder. The airflow is at a temperature of 80–95° C. and this reduces the water content of the particles to 2–3% by mass. In this grinder the particles are reduced to less than 50 microns in diameter and take the form of a dispersible powder. This powder may be packaged and sold commercially as, for example, a dye for food products.

EXAMPLE 2

The dispersible powder formed in EXAMPLE 1 is added to water at a ratio of no more than 1:7 powder to water. The mixture is then boiled for not less than 30 minutes. To facilitate the extraction of dye from the dispersible powder and to speed up the extraction time, the mixture may be subject to concurrent sonication at a frequency of not less than 10 Hz.

Any sediment is removed by filtration. Alternatively, the sediment may be allowed to settle and the liquid decanted. Benzoic acid may be added to the extract as a preservative in an amount of 1–3% by mass. At this point the extract may be bottled and sold commercially. One use of the extract is as a dye in hair color products.

EXAMPLE 3

The liquid extract obtained pursuant to EXAMPLE 3 prior to the addition of preservative is spray dried at a temperature of 100–170° C. This results in a powder that is no more than 2–3% water by mass. This powder may be packaged and sold commercially for use as a dye in, for example, food products, cosmetics and hair color products.

EXAMPLE 4

The solubility of the dispersible powder produced according to the method of the present invention was measured and compared to the solubility of 100–200 micron particles of unripe walnut rind produced according to a traditional method described in the Russian Federation Patent No. 2035478. The solubility was evaluated based on the rate of extraction in boiling water. The results are presented in Table 1.

TABLE 1

| Material | Rate of extraction (hours) | Solubility (%) |
| --- | --- | --- |
| Dispersible powder prepared by the method of the present invention | 0.5 | 77.0 |
| 100–200 micron particles manufactured according to traditional method | 1.5 | 37.0 |

From Table 1 it is clear that the extraction of dye from the rind of unripe walnut rind according to the method of the present invention is more than 2 greater than that prepared according to a traditional method. In addition, the rate of extraction is 3 times faster using the method of the present invention.

EXAMPLE 6

The black dye obtained by the method of the present invention may be used to color food products. For example, the dispersible powder from EXAMPLE 1 and the powdered dye from EXAMPLE 3 may be used to color confectionery products, such as ice cream or cakes. The powder may be incorporated into the product during manufacture.

EXAMPLE 7

The liquid extract from EXAMPLE 2 and the powdered dye from EXAMPLE 3 may be used in hair color products. The liquid extract may be diluted in 100 times the volume of hot water. The powdered dye may be dissolved in hot water at the ratio of 5 g powdered dye per 500 ml of water. The resulting solution is applied to the hair for 20–40 minutes. The solution is then washed away with water.

In addition to color, the dye increases the luster of hair and does not cause the hair to become fragile. The dye does not cause dandruff.

What is claimed is:

1. A method of preparing a black dye, comprising:
   obtaining unripe walnut rinds;
   drying said walnut rinds to produce dried walnut rinds;
   grinding the dried walnut rinds to form a dispersible powder; and
   preparing a black dye consisting essentially of said dispersible powder.

2. The method of claim 1, wherein said dried walnut rinds contain no more than 50% water by mass.

3. The method of claim 1, wherein said dried walnut rinds are further dried during said grinding.

4. The method of claim 1, wherein said dispersible powder contains no more than 10% water by mass.

5. The method of claim 1, wherein said grinding is accomplished in a plurality of steps.

6. The method of claim 5, wherein a first grinding step produces particles of 0.1–10 mm in diameter.

7. The method of claim 5, wherein a second grinding step produces particles of less than 100 microns in diameter.

8. The method of claim 1, additionally comprising mixing said dispersible powder with water to form a mixture.

9. The method of claim 8, wherein the mixture has a ratio of dispersible powder to water of from 2:1 to 1:20.

10. The method of claim 8, additionally comprising boiling said mixture.

11. The method of claim 8, additionally comprising sonicating said mixture.

12. The method of claim 10, additionally comprising filtering the boiled mixture.

13. The method of claim 12, additionally comprising drying the filtered mixture.

14. The method of claim 12, additionally comprising adding a preservative to the filtered mixture.

15. The method of claim 14, wherein said preservative is benzoic acid.

* * * * *